Jan. 7, 1964 — O. E. ANDRUS — 3,116,548

METHOD OF BONDING METAL MEMBERS

Filed Jan. 3, 1958

INVENTOR.
ORRIN E. ANDRUS
BY
Andrus, Sceales & Starke
Attorneys

United States Patent Office 3,116,548
Patented Jan. 7, 1964

3,116,548
METHOD OF BONDING METAL MEMBERS
Orrin E. Andrus, Madison, Wis., assignor to A. O. Smith Corporation, Milwaukee, Wis., a corporation of New York
Filed Jan. 3, 1958, Ser. No. 706,995
2 Claims. (Cl. 29—471.5)

This invention relates to a method of bonding metal members, and more particularly to a method of bonding a plurality of metal members together under controlled conditions of heat and pressure.

The method contemplated includes, generally, placing a plurality of metal members in juxtaposed intimate contact, sealing the edges thereof, submerging the composite structure in a molten salt bath of predetermined characteristics, and applying an external pressure to the salt bath which in turn bonds the members together uniformly throughout.

The method of the invention is particularly useful in situations where due to the contour of the members to be welded and/or their difference in gauge, conventional type bonding methods are impractical and ineffective. The use of the salt bath permits the bonding pressure to be transmitted uniformly to the members to be bonded and represents a simple, effective means of applying pressure to contoured as well as flat surfaces. The salt bath serves the further purpose of maintaining the members at a temperature sufficient to cause bonding upon application of a substantial pressure force.

Light and heavy gauge members of various flat or curved shapes may be joined readily and economically by the method of the invention.

Furthermore, the bond may be effected under carefully controlled conditions as both the pressure applied to the salt bath and the salt bath temperature may be accurately controlled.

The uniform application of pressure to the surfaces of the members produces a high quality weld or bond between the members.

Other objects and advantages will appear in the course of the following description.

The drawing illustrates the best mode presently contemplated of carrying out the invention.

Figure 1:
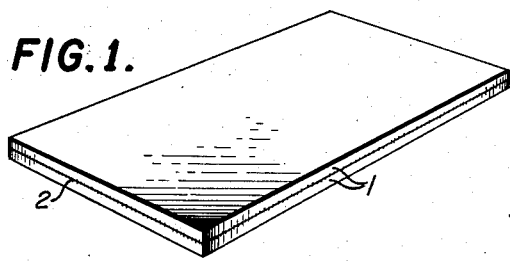
FIGURE 1 is a perspective view of a pair of flat metal plates joined together at the edges.

As shown in the drawings, the method of the invention may be used to integrally bond a pair of flat metal plates 1 together face-to-face to form a laminated assembly. Plates 1 may be made of carbon steel, copper, stainless steel or other desired material and which have been cleaned and otherwise treated to present the proper surfaces for bonding. The plates are initially placed together face-to-face in juxtaposed intimate contact and provided with a weld 2, or otherwise secured together at the edges, to provide a hermetic seal, as shown in FIGURE 1. In order to prevent any undesirable build-up of pressure between plates 1 during subsequent steps, it may be desirable to evacuate any gases from between the plates. Evacuation may be accomplished by any suitable means such as that shown in Patent No. 2,713,-196, issued July 19, 1955.

Figure 2:
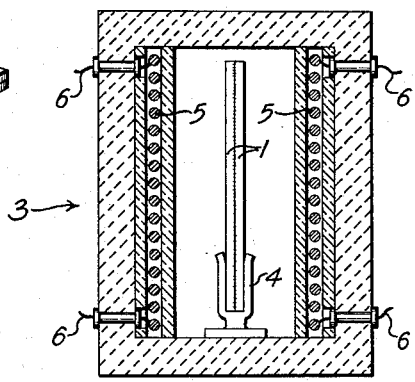
FIGURE 2 is a vertical sectional view of a furnace showing the preheating step.
Figure 3:
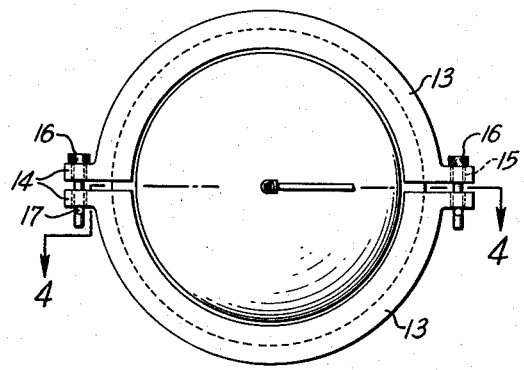
FIGURE 3 is a top plan view of the bonding chamber.

In the next step of the method, shown in FIGURE 2, the plates 1 are placed in a suitable furnace 3 and are held in an upright position therein by means of a rack 4.

A pair of coils 5 connected to suitable leads 6 is provided in furnace 3 and serves to heat plates 1 to a temperature determined in a manner to be described. Subsequently, the heated plates are removed from furnace 3 and placed in a bonding chamber, indicated generally at 7.

Chamber 7 is capable of withstanding high pressures and to that end is provided with heavy steel walls 8 having a tapered flange 9 at its open end. For example, pressures within the range of 1,000 p.s.i. to 5,000 p.s.i. would be suitable in bonding an ⅛ inch thick stainless steel sheet to a 1 inch thick steel plate. A steel cover plate 10 lined with a refractory material 11, such as brick, to reduce heat loss therethrough, closes chamber 7 during the bonding process. The cover plate 10 is provided with a tapered flange 12 which is adapted to register with flange 9 of chamber 7.

It is preferred that cover plate 10 be of the type which can be quickly applied and removed from chamber 7 so as to minimize the period of time during which plates 1 are enclosed within chamber 7 as undesirable grain growth may take place in the plates at the high temperatures employed in the bonding process.

Accordingly, a split ring 13 having an inner surface tapered to complement the tapered flanges 9 and 12 of bonding chamber 7 and cover plate 10, respectively, is disposed around the periphery of the juncture of the same. When installed, the sections of the split ring 13 are held tightly together by means of flanges 14 provided with registering openings 15. The openings 15 are adapted to receive bars 16 having an enlarged head at one end and a transversely extending opening at the other end.

With the cover plate 10 closing chamber 7 and split ring 13 disposed around the periphery of their juncture, suitable tapered pins 17 are driven into the transversely extending openings in bars 16 to move the split ring sections towards one another and force cover plate 10 into sealing contact with chamber 7.

An O-ring 18 serves to form a gas-tight joint between the cover plate and bonding chamber when the split ring is secured into place as described.

The interior of chamber 7 is provided with a ceramic lining 19 having disposed therein a quantity of a suitable salt 20 such as barium chloride or combinations of barium chloride and sodium chloride. Salt 20 may be placed in chamber 7 in the solid state and then liquified by heating it to the desired temperature. Liquification may be accomplished by disposing a pair of spaced electrodes 21 in the solid salt, melting sufficient salt between the electrodes by means of an acetylene torch or the like, not shown, to provide a liquid path or puddle between the electrodes, and subsequently passing an electric heating current between the electrodes. The molten salt puddle between electrodes 21 will provide sufficient resistance to the current to create a substantial amount of heat which will maintain the puddle in a molten condition and gradually liquify all the salt in chamber 7.

Electrodes 21 are connected to an outside source of electric power through suitable leads 22 which sealably pass through the walls 8 of chamber 7, and lining 19.

During the bonding process, heat transferred from the salt bath 20 through lining 19 to the chamber walls 8 is continually being removed therefrom by means of a water jacket 23 surrounding the walls. As the strength of the walls 8 varies indirectly according to their temperature, this heat removal maintains the strength of the walls at a level sufficient to withstand the high pressure maintained within chamber 7. For the same reason, a water jacket may be provided for cover 10. Water jacket 23 serves the further purpose of solidifying any molten salt which might escape from chamber 7 through lining 19 thereby restricting further escape of the molten salt and preventing prolonged exposure of the chamber walls to the high temperature molten salt.

Plates 1 are submerged in the molten salt 20 and supported in any suitable way, such as by racks 24. Alternately, plates 1 may be suspended from cover 10, especially where extremely high temperatures are employed. Heat will be conducted to all exposed surfaces of the plates uniformly and simultaneously. The heated plates 1 are maintained in the molten salt bath while their temperatures become stabilized at a point suitable for subsequent welding. Generally, this temperature will be 100–200° F. below the lowest melting point of either of the metal plates being bonded. At bonding pressures ranging from 2000–3000 p.s.i., a stabilized temperature within the range from 2100° to 2300° F. has been found suitable for stainless steel while copper would require a stabilized temperature of about 1600° F. However, the bonding temperature varies indirectly according to the particular bonding pressure utilized. Thus, where metallurgical changes in the plates, such as grain growth, require a lower bonding temperature, it may be necessary to employ a pressure above the more usual 2000–3000 p.s.i. range to attain a good bond.

The salt can be any material which has a melting temperature beneath the lowest melting temperature of either of the metals being bonded and which will not decompose appreciably or react with the metal plates when in the molten state. Salts which are suitable in the method for bonding stainless steel include: (a) barium chloride, which melts at 1800° F.; and (b) a salt comprising 92–96% barium chloride and 4–8% sodium chloride, which melts at 1600° F. and has an effective operating range from 1750° F. to 2300° F. Salts having lower melting temperatures and correspondingly lower effective operating ranges would be required in bonding metals, such as copper, which melt at a temperature substantially below that of stainless steel. When the molten salt is within the effective operating range, it is considered stable.

If plates 1 are at a temperature below the melting point of the salt when they are placed in the salt bath, "freezing" or solidifying of the salt around the members may be encountered. This is prevented by preheating plates 1 in furnace 3. The preheat temperature and thus the approximate temperature of the plates when they are placed in salt bath 20, will be at least equal to the melting temperature of the particular salt being used and normally will range from this latter temperature to one approximately equal to the final stabilized temperature of the plates.

The extent to which the plates 1 are preheated above the melting temperature of the salt depends upon both the metallurgical characteristics of the plates being bonded and the tendency of the same to warp upon the application of heat. In the event metallurgical changes, such as grain growth, are induced in the metals being bonded by temperatures ranging from the melting point of the salt to the stabilized temperature of the plates, it is highly desirable to heat the plates rapidly in this temperature range to decrease the extent of grain growth. This may be accomplished by using the salt bath rather than the furnace as a heating means, and, in such a case, the pre-heat temperature of the plates would be approximately equal to the melting temperature of the salt. On the other hand, rapid heating may promote warping of plates 1 and, from this standpoint, the above described procedure is undesirable. Under these circumstances it is preferred to heat plates 1 slowly, such as by the use of furnace 3, to their final stabilized temperature. Thus, if the plates have a tendency to warp, the pre-heat temperature would be approximately equal to the final stabilized temperature of the plates.

Where both metallurgical changes and warping tend to occur in the plates at the temperature ranges employed in the method of the invention, the relative rates at which each occurs and the effect of each upon the final bonded structure must be considered in selecting the preheat temperature.

The salt bath 20 controls the temperature of the plates and insures that the plates will be at the desired temperature for producing a satisfactory bond upon the subsequent application of pressure. Depending upon the temperature of the plates when they are immersed in the bath, the bath may either raise or lower the temperature of the plates or, in the event the plates are at the desired temperature when they are placed in the bath, maintain the temperature at a constant level.

After the initial heating steps during which a composite structure 1 is brought to a temperature suitable for welding, pressure is applied to the surface of the molten salt bath which, in turn, applies pressure uniformly over the entire exposed surface of plates 1 and welds them together.

Various means for supplying pressure to the salt bath may be used but essentially it is desirable to build up the pressure in a relatively fast manner to reduce the length of time during which the plates are submerged in the salt bath.

One such method comprises introducing compressed gas into the chamber in an amount sufficient to produce the welding pressure required for the particular metal or metals being welded and the particular temperature of the salt bath utilized.

A suitable structure for providing such pressure includes a compressed gas cylinder 25 disposed adjacent chamber 7 and which communicates with the latter through a conduit 26. The conduit 26 extends through cover plate 10 and is provided with a valve 27 which allows the compressed gas to be controllably admitted into chamber 7.

As the gas is introduced into the chamber and is limited by the confining walls of chamber 7, a substantial pressure builds up in chamber 7 and is applied to the upper surface of the molten salt. The pressure is transferred through the salt bath to plates 1, and increases until the pressure in the chamber and on the plates is within the range at which welding of the plates occurs. When this happens the supply of compressed gas is shut off and a valve 28 disposed in conduit 26 is opened to relieve the pressure within chamber 7. Cover 10 is quickly removed and the plates withdrawn from the chamber. A pressure relief valve 29 is also disposed in conduit 26 to prevent the build-up of excessive pressure within chamber 7.

Many other means may be employed for applying the bonding pressure. Such means include use of controlled explosives such as slowly exploding propellant material, a piston mechanism bearing directly upon the bath, and certain chemical reactions which produce a gaseous product or products.

Figure 4:
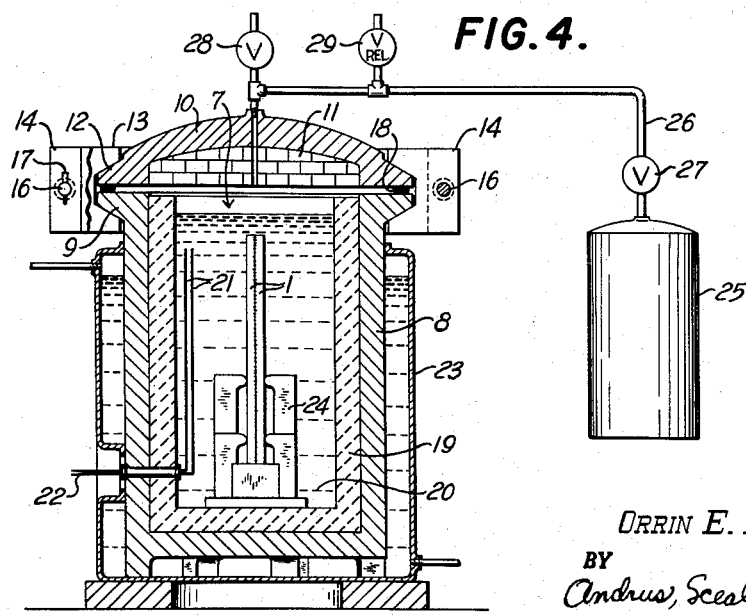
FIGURE 4 is a vertical section taken along line 4—4 of FIGURE 3.

Use of compressed gas is preferred as it eliminates the need for installing special equipment either within or without the bonding chamber such as would be required if a propellant material or the like were used. Furthermore, compressed gas is inexpensive, readily available and relatively safe to handle. As shown in FIGURE 4, the space in chamber 7 defined by the upper surface of salt bath 20 and the inner surface of cover plate 10 is relatively small and thus the pressure may be rapidly brought up to the desired level by a relatively small quantity of compressed gas.

The pressure necessary for bonding will depend on the dimensions, shape and composition of the members to be joined. As stated previously, the salt bath temperature will also have a decided effect thereon. The bonding pressure will be within the range of from 500 p.s.i. to 5000 p.s.i. and for bonding stainless steel to carbon steel may be 3000 p.s.i.

Subsequent to bonding, the now integrally joined member is removed from chamber 7, and if desired the edges thereof are ground down to remove the arc weld material therefrom. Only a composite integral structure remains.

The method may be utilized in joining members together to form laminated cylinders, nozzle necks, small flanged parts, or other structures. Light and heavy gauge members can be joined with equal ease.

The invention provides a novel method for bonding metal members of various flat or curved shapes together. The bonding temperature may be accurately controlled. The molten salt does not act as a welding flux, since it cannot enter between the plates. In addition, the salt not only functions as a heat transfer medium to adjust the temperature of the plates, but also transmits the welding pressure uniformly to the members to produce a bond of high quality throughout. Furthermore, the salt bath provides a protective covering around the outer surfaces of the plates and prevents oxidation thereof during the bonding process.

Various modes of carrying out the invention are contemplated as being within the scope of the following claims particularly pointing out and distinctly claiming the subject matter which is regarded as the invention.

I claim:

1. In the method of bonding a pair of metal members assembled in mutually facing relation and sealed around their edges by submerging the same in a molten salt bath confined within a chamber, the step of controllably releasing a fluid within said chamber to provide an increase in pressure within the confines of the chamber, said increased pressure being transmitted uniformly to said members through said salt bath to force the members intimately together over their contacting areas to effect a bonding of the members.

2. The method of claim 1 including the step of preheating the members to a predetermined level below the melting temperature thereof and above the solidification temperature of the salt bath prior to submerging the members in the salt bath for final bonding.

References Cited in the file of this patent
UNITED STATES PATENTS

| | | |
|---|---|---|
| 1,152,610 | De Bats | Sept. 7, 1915 |
| 2,181,092 | Ness | Nov. 21, 1939 |
| 2,478,037 | Brennan | Aug. 2, 1949 |
| 2,512,206 | Holden et al. | June 20, 1950 |
| 2,539,248 | Lynch et al. | Jan. 23, 1951 |
| 2,599,779 | Rajtora | June 10, 1952 |
| 2,648,125 | McKenna et al. | Aug. 11, 1953 |
| 2,703,297 | MacLeod | Mar. 1, 1955 |
| 2,713,196 | Brown | July 19, 1955 |
| 2,735,170 | Moffatt | Feb. 21, 1956 |
| 2,794,243 | Schweller | June 4, 1957 |
| 2,809,423 | Hanink | Oct. 15, 1957 |
| 2,818,637 | Roberts | Jan. 7, 1958 |
| 2,820,286 | Andrus | Jan. 21, 1958 |
| 2,845,698 | Giovannucci | Aug. 5, 1958 |